United States Patent

[11] 3,586,785

[72] Inventor Alexander Feiner
Chicago, Ill.
[21] Appl. No. 823,258
[22] Filed May 9, 1969
[45] Patented June 22, 1971
[73] Assignee Bell Telephone Laboratories, Incorporated
Murray Hill, Berkeley Heights, N.J.

[54] ARRANGEMENT FOR PROCESSING ABANDONED AND SUBSEQUENTLY INITIATED CALLS
18 Claims, 7 Drawing Figs.

[52] U.S. Cl. .................... 179/18 F
[51] Int. Cl. .................... H04q 3/22
[50] Field of Search .................... 179/18, 7.1, 18 F

[56] References Cited
UNITED STATES PATENTS

| | | | |
|---|---|---|---|
| 3,426,155 | 2/1969 | Warman | 179/18 F |
| 3,337,692 | 8/1967 | Bruglemans | 179/18 F |

*Primary Examiner*—Kathleen H. Claffy
*Assistant Examiner*—Thomas W. Brown
*Attorneys*—R. J. Guenther and R. B. Ardis

ABSTRACT: An arrangement is disclosed for delaying the release of a dialing connection between a calling telephone station and a central office register when the station prematurely disconnects to permit the station to originate another call within a specified interval of time. The register is returned to a state in which it can accept a new complement of dialing signals. If another call is not originated within the specified interval of time, the register and the dialing connection through the switching network of the central office are released.

INVENTOR
A. FEINER
BY Daniel E. Nester
ATTORNEY

ARRANGEMENT FOR PROCESSING ABANDONED AND SUBSEQUENTLY INITIATED CALLS

BACKGROUND OF THE INVENTION

This invention relates generally to communication switching systems, and particularly to the reception, storage, and processing of switching control information signals transmitted by a telephone customer s STATION.

Studies of customer signaling performance have revealed that a significant portion of the customers abandon a telephone call during the signaling process, i.e., the station disconnects prior to the transmittal of a complete complement of switching control information signals. In addition, these customer signaling performance studies have disclosed that a majority of the customers who abandon a call during the signaling process immediately thereafter originate another call.

In the past, the abandonment of a call by a customer during the signaling process caused the tearing down of the transmission path through the switching network between the customer station and the signal receiving and storage equipment of the communication switching system. When the customer, who has abandoned the call, subsequently originated another call, a complex series of network manipulations had to be performed by the communication switching system to establish another transmission path between the customer station and the signal receiving and storage equipment. This rapid sequence of abandoning a call during the signaling process and subsequently originating another call, resulted in a large number of redundant manipulations of the network. Coincident with the redundant manipulations of the network equipment is the consumption of an additional increment of the operating time of the common control equipment of the communication switching system. A reduction in the traffic-handling efficiency of the communication switching system is concomitant with the consumption of real-operating time caused by the redundant network manipulations.

An object of this invention is the minimizing of the real-operating time of common control equipment that handles the origination of a call by a customer station subsequent to the abandonment of another call by the same customer station during the signaling process.

Another object of this invention is the reduction of the number of network manipulations required to originate a call immediately subsequent to the abandonment of another call by the same station during the signaling process.

SUMMARY OF THE INVENTION

These and other objects of the invention are obtained in accordance with an exemplary embodiment thereof wherein an abandon call control circuit monitors the signal-receiving equipment of a communication switching system for the abandoning of a call prior to the reception and storage of a complete complement of signals, i.e., detection of call control circuit, in response to detection of the abandonment during the signaling process, causes the transmission path between the customer's station and the signal receiving and storage equipment to be retained for a specified time interval subsequent to detection of the call abandonment. The abandon call control circuit, subsequent to detection of the call abandonmemt, initializes designated elements of the signal receiving and storage equipment i.e., the abandon call control circuit clears the designated elements of priorly stored signals and returns the elements to their initial state. The initializing of the designated elements is a precondition to the reception and processing of signals subsequently transmitted by the customer for the purpose of originating another call.

The abandon call control circuit impresses a dial tone signal upon the retained transmission path subsequent to the successful initializing of the designated elements. The dial tone signal informs the customer who has abandoned the call during the signaling process that he may, if he so desires, originate another call. The origination of another call during the specified time interval inhibits the automatic disconnection function that destroys the transmission path between the customer's station and the signal receiving and storage equipment. After the elapsing of a specified time interval without origination of another call, the signal receiving and storage equipment is automatically disconnected from the customer's line. Subsequent to the elapsing of the specified interval without origination of another call, all the elements of the signal-receiving and storage equipment and the abandon call control circuit are returned to their released state. In the released state, the signal receiving and storage equipment is poised, ready to service incoming calls from another customer-requesting service.

According to a feature of the invention, an established transmission path between a customer's station and siganl-receiving and storage equipment is retained for a specified time interval, when the station disconnects prior to the reception and storage of a complete complement of switching signals.

Another feature of the invention is the initialization of the signal receiving and storage equipment without release thereof when the call is abandoned prior to the reception of a complete complement of switching signals.

A further feature of the invention is the impressing of a dial tone signal upon the retained transmission path for a specified time interval when the call is abandoned prior to the reception and storage of a complete complement of switching signals.

The present invention surmounts disadvantages of the additional network manipulations inherent in preexisting arrangements for the processing of a call that is abandoned prior to the transmission of a complete complement of switching control information signals. The retention of the original transmission path, subsequent to the abandonment of the call during the signaling process, eliminates the network manipulations that were priorly required to establish another connection to the signal receiving equipment. The retention of the original transmission path therefore conserves the real-operating time of the common control equipment. This permits an increase in the traffic-handling capacity of the communication switching system.

The aforegoing objects and features of the present invention, as well as others, will be apparent from the subsequent description of the exemplary embodiment shown in the drawing.

BRIEF DESCRIPTION OF THE DRAWING

FIG. 2 is a diagram of the pulse-counting circuitry;

FIG. 3 is a diagram of the digit registration circuitry;

FIG. 4 is a diagram of the digit-steering circuitry;

FIG. 5 is a diagram of the dial tone circuit;

FIG. 6 is a diagram of the release connection control circuits;

Figure 1:
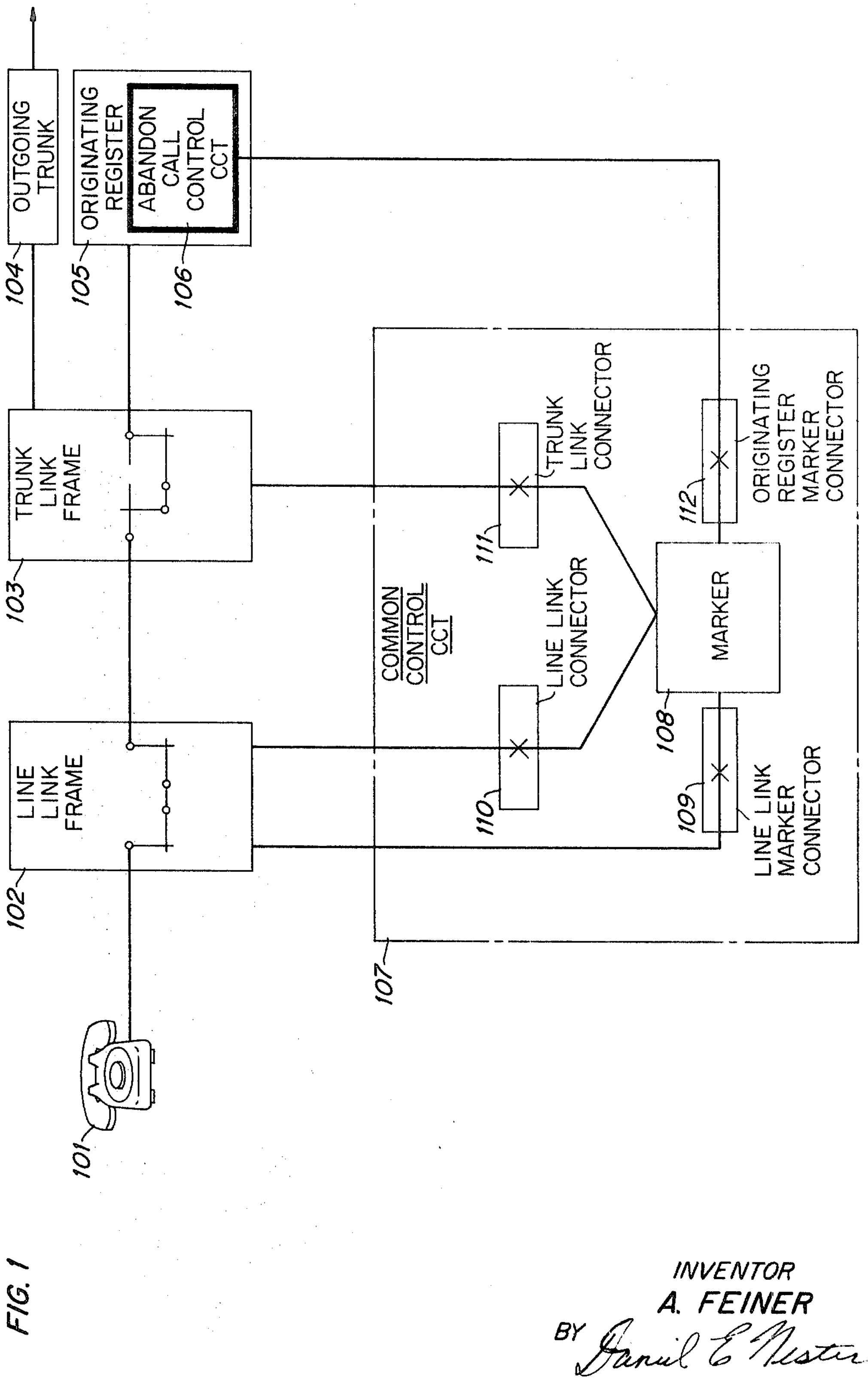
FIG. 1 is a block diagram showing the interrelation of the component elements of the exemplary embodiment.

It will be noted that FIGS. 2 through 7 employ a type of notation referred to as "Detached Contact." In this notation an "X," shown intersecting a conductor, represents a normally open "make" contact of a relay, and a "bar" shown intersecting a conductor at right angles, represents a normally closed "break" contact of a relay. The term "normally" refers to the unoperated condition of the relay. The principles of this type of notation are described in an article entitled "Detached Contact Schmeatics" by J. W. Gorgas in the July 1954 *Bell Laboratories Record*, Volume 32, pages 261—266.

For the purpose of illustration, as discussed in detail hereinafter, some of the figures of the drawing illustrate apparatus disclosed in a previously issued patent. In order to facilitate a clear understanding of the instant invention, such apparatus designations have been retained to facilitate cross-reference with the patent from which they were derived.

The present invention is illustrated herein by a specific embodiment thereof which is described as being incorporated in a known common control automatic telephone system. The common control system is disclosed in the A. J. Busch U.S. Pat. No. 2,585,904, issued Feb. 19, 1952. The Busch patent discloses a switching system arranged for the processing of seven-digit called directory numbers from a multiplicity of single-party, noncoin telephone station sets which are equipped with dial pulse switching control information signal generators. It is to be understood, however, that the present invention is not limited to use with a telephone system so arranged but may be utilized with other types of switching systems.

To facilitate an understanding of the relationship between the description presented herein and the disclosure of the Busch patent, there is given below in Table I a cross-reference between elements of the instant disclosure and of the Busch patent. Specifically, in Table I the apparatus components cited in this disclosure are listed and indexed according to the corresponding figures of the drawing in the Busch patent. In the subsequent detailed description, reference may be made back to this table as an aid in understanding the presently disclosed embodiment of the invention.

TABLE I

A. J. Busch Patent 2,585,904

| Apparatus component: | FIG. Number |
|---|---|
| Relay A0 | 184 |
| Relay A1 | 184 |
| Relay A2 | 184 |
| Relay A4 | 184 |
| Relay A7 | 184 |
| Relay AS | 218 |
| Relay BS | 218 |
| Relay CS | 218 |
| Relay GS | 218 |
| Relay L | 220 |
| Relay MS1 | 142 |
| Relay MST1 | 142 |
| Relay ON | 220 |
| Relay ON1 | 220 |
| Relay P1 | 220 |
| Relay P2 | 220 |
| Relay P3 | 219 |
| Relay P4 | 219 |
| Relay P5 | 219 |
| Relay P2A | 219 |
| Relay RA | 219 |
| Relay RA1 | 219 |
| Relay SR | 220 |
| Transformer TN | 220 |

Figure 3:
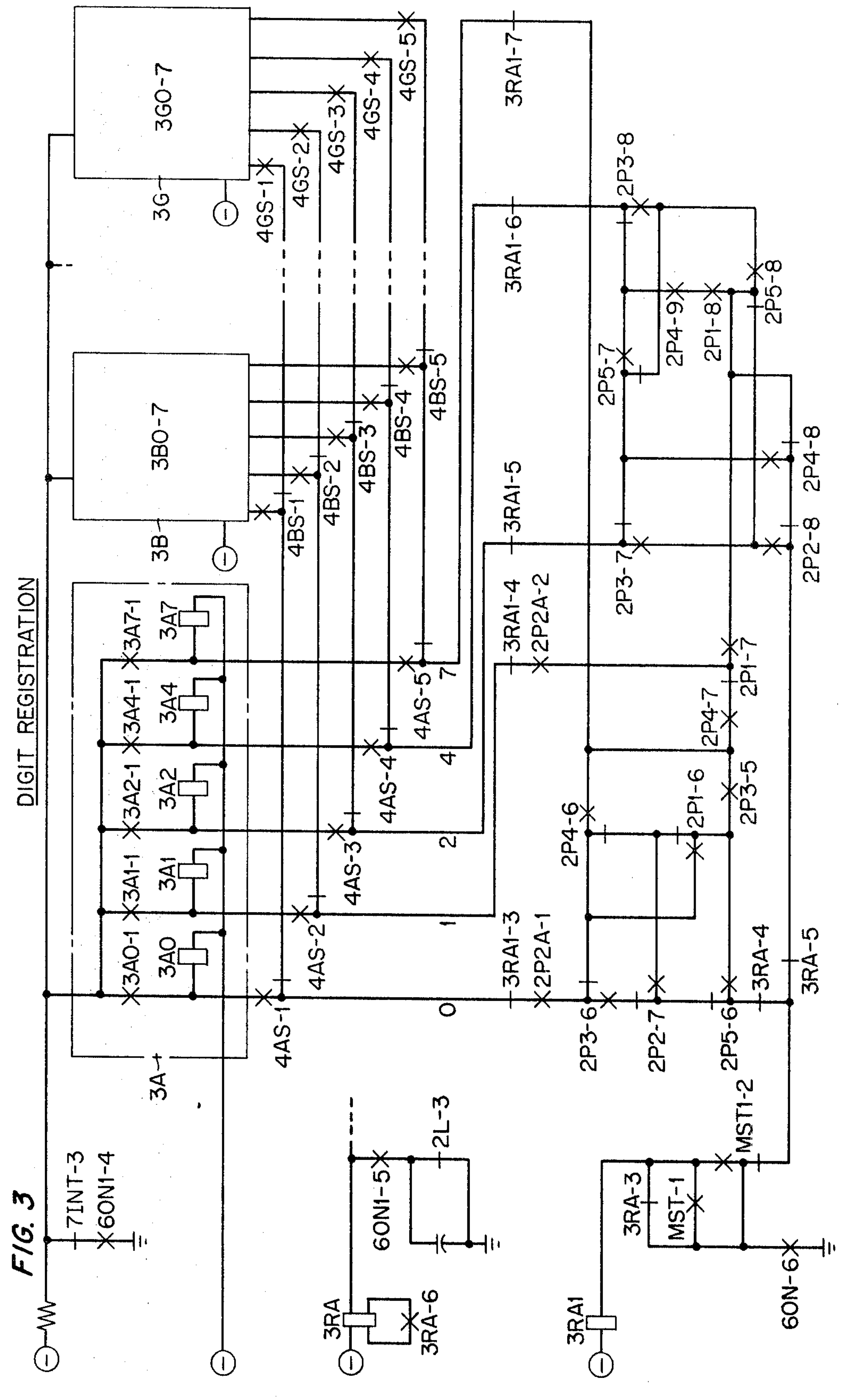

The designation scheme for the drawing that illustrates the present invention comprises a single-digit prefix that indicates the figure of the drawing where the principal part of the apparatus is disclosed and an alphanumeric suffix that indicates the function of the apparatus. Relay contacts are detailed by a numerical indicator that is subsequent to the alphanumeric functional indicator of the given relay. An example of this designation scheme is the contacts of register advance relay 3RA—1, where the 3 indicates that the winding of the register advance relay is shown in FIG. 3, the RA indicates the register advance function of the relay, and the –1 indicates contacts number 1. In addition, the alphanumeric suffix correlates with the designation used in the Busch patent as listed above in table I; i.e., the relay 3RA of the instant disclosure is the functional equivalent of the relay RA that is disclosed on FIG. 219 of the Busch patent.

For the purpose of illustration, it is intended that the apparatus of line link frame 102, trunk link frame 103, outgoing trunk 104, originating register 105, and common control circuit 107 corresponds to apparatus disclosed in the Busch patent. For a more complete understanding of the construction and operation of these components, the aforementioned patent may be consulted.

DETAILED DESCRIPTION

General (FIG. 1)

The station 101 is shown connected to line link frame 102. Outgoing trunk 104 and originating register 105 are shown connected to trunk link frame 103. As fully disclosed in the Busch patent, lines terminated on line link frame 102 and trunks connected to trunk link frame 103 are interconnected by crossbar switches on these frames and by interframe junctors. The transmission path for the switching control information signals generated at station 101 comprises a line between station 101 and the line link frame 102, crossbar switches of line link frame 102, interframe junctors between line link frame 102 and trunk link frame 103, crossbar switches of trunk link frame 103 and the originating register 105 that is terminated on trunk link frame 103. All such interconnections of the switching network that comprise line link frame 102, trunk link frame 103, and interframe junctors, are effected under control of the marker 108 and various connector circuits 109, 110, 111, and 112 of the common control circuit 107.

When a customer originates a call from station 101, the line link frame 102 engages a idle marker 108 over the line link marker connector 109 and identifies itself to the marker 108, the connector 109 informing the marker 108 that a switching control information signal connection is to be established. The marker 108 then proceeds to select a trunk link frame 103 having an idle originating register 105 through the trunk link connector 111. The marker 108 then selects an idle originating register 105 and connects to it. As soon as the trunk link frame 103 has been seized, the marker 108 connects with the line link frame 102 through the line link connector 110 and completes the identification of the calling line, a part of which was obtained through the line link marker connector 109. When an idle originating register 105 has been seized, the marker 108 selects the transmission path that connects the calling customer with the originating register 105. The marker operates the select and hold magnets of the crossbar switches to complete the transmission path, passing the identity of the line link employed in the transmission path to the originating register 105, and releases.

The customer then signals the designation of the wanted line into the originating register 105. When registration has been completed, the originating register 105 seizes an idle marker 108 through the originating marker connector 112 and transmits to the marker 108 the calling line location and the called number.

In accordance with the instant invention, the abandon call control circuit 106 monitors the supervisory state of the transmission path between the originating register 105 and station 101. The detection of a protracted on-hook supervisory state, prior to the receiving and storage of a complete complement of switching signals, indicates an abandonment of the call. The abandon call control circuit 106, in response to the detection of a protracted on-hook state, inhibits the release of the transmission path between station 101 and the originating register 105; and causes the initializing of designated signal receiving, steering, and storage elements within the originating register 105.

The initializing of the designated elements comprises a two-step process; first, the clearing of the priorly stored signals from the designated elements; and second, the restoration of the designated elements to the initial state. The initial state of the designated elements is defined as the state they were in immediately after the marker 108 is released from the originating register 105. Subsequent to the restoration of the designated elements of the initial state, a dial tone signal is impressed upon the retained transmission path between the originating register 105 and the station 101 for the purpose of alerting the customer of his opportunity to originate another call.

Concurrent with the initializing of the designated elements of the originating register 105, a timer 701 within the abandon call control circuit 106 is actuated to measure a specified time interval pending the origination of another call. The elapsing of the specified interval without another call origination causes the actuation of the release connection control circuits (FIG. 6) of the originating register 105. The actuation of the release connection control circuits (FIG. 6) of the originating register 105 causes the following actions: the release of the transmission path between the originating register 105 and the station 101; the release of all the relays of the originating register 105; the inhibiting the timer 701; and the release of the relays of the abandon call control circuit 106. Thus, all the circuitry of the originating register 105 and the abandon call control circuit 106 are returned to a quiescent state. The quiescent state for the abandon call control circuit 106 and the originating register 105 is defined as the state where the elements of the originating register 105 are restored to the state they were in prior to the seizure of the originating register 105 by the marker 108; i.e., the originating register 105 is ready for another seizure by the marker 108.

Figure 6:
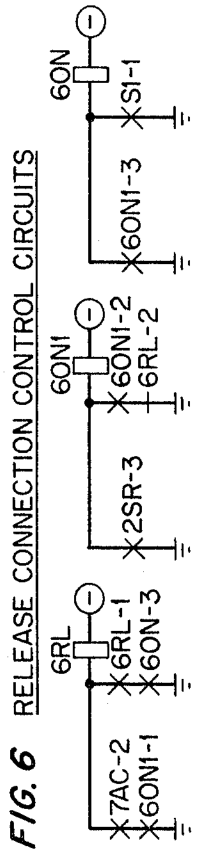

The timer 701 of the abandon call control circuit 106 will be inhibited by the origination of another call prior to the elapsing of the specified interval. The inhibiting of the timer 701 of the abandon call control circuit 106 causes the inhibition of the release connection control circuits (FIG. 6). The inhibition of the release connection control circuits (FIG. 6) permits the retention of the transmission path between the station 101 and the originating register 105.

The switching control information signals that are subsequently transmitted from the station 101 to the originating register 105 over the retained transmission path will be processed as a new call in the fashion described in the Busch patent. Thus, assuming that the called directory number indicates a customer in another central office area, a connection is established from station 101 via outgoing trunk circuit 104 to that customer's line. originating register Call Processing by Originating Register (FIGS. 1, 2, 3, 4, 5, 6, and 7)

It will be assumed that the calling customer wishes to establish a connection to the line identified by the digits 636-7890. It will be further assumed that after dialing the first digit 6 the customer abandons the call by placing the receiver of the station 101 of the switchhook; i.e., generating a protracted on-hook signaling state on the transmission path.

As described in the Busch patent, the initial seizure of the originating register 105 by the marker 108 caused the operation of he following relays: off-normal relay 60N, register advance relay 3RA1, and digit-steering relay 4AS. Also as described in the Busch patent, the release of the originating register 105 by the marker 108 upon the establishment of the transmission path between the station 101 and the originating register 105 caused the operation of the following relays: line-pulsing relay 2L; supervisory relay 2SR; and off-normal relay 60N1. Thus, the following relays are in the operated state subsequent to the release of the originating register 105 by the marker 108: 2L, 2SR, 4AS, 60N, and 60N1; while relay 3RA1 is in the released state. The operation of relay 2SR caused dial tone to be impressed upon the transmission path.

Pulse Counting

As is well known in the telephone art, a dialed digit is transmitted as a train of pulses consisting of one to ten equally spaced momentary line openings; i.e., on-hook signal states, that are controlled by the calling customer's dial. the number of line openings corresponds to the number dialed, one for the number 1, two for the number 2, etc. and ten for the number 0. These pulses may be at the nominal rate of 10 to 20 each second. Between these trains of pulses an interdigital interval exists during which the calling loop remains closed; i.e., in the off-hook signal state. The line pulsing relay 2L, shown in FIG. 2, responds to the dial pulses, and the counting circuit including relays 2P1 through 2P5 counts the number of pulses in each digit. During the interdigital interval the count is transferred to the proper digit register unit. When this transfer is completed the counting relays 2P- are released and the counting circuit is ready to count the pulses of the next digit. The end of the digit is recognized by means of a slow release register advance relay 3RA, the contacts of which (FIGS. 2 and 3) operate during the first open pulse and release during the interdigital interval. The contacts of this relay control the transfer of the count for each digit to the proper digit register unit.

The counting and registration of a digit takes place as the contacts of relay 2L (FIG. 2) respond to the customer dial and the counting circuit counts the number of pulses. Relay 2L is operated each time the customer loop is closed.

As will be seen in the following explanation, relay 3RA operates during the first dial pulse when relay 2L releases in response to the open customer loop; i.e., an on-hook signal. Relay 3RA will remain operated until the interdigital interval when relay 2L is held operated in response to the closed customer loop; e.e., an off-hook signal. The dial pulse-counting circuit consists of relays 2P1—2P5 and auxiliary pulse counting relay 2P2A. Relays 2P1 and 2P2 function as pulse dividers from relay 2L

The operation of the pulse-counting circuitry will be described with respect to the first digit. The first release of 2L, i.e., the first on-hook signal, causes the operation 2P1 via the path that comprises ground, the released transfer contacts 2L—1, the operated make contact 2SR—1, the released transfer contact 2P2—1, the winding of relay 2P1, and negative battery. Relay 2P1 locks operated over the operated make contacts 2P1—1, the operated make contacts 60N—8 and 3RA—2, the released break contacts 7INT—1 of the initialization relay 7INT, and ground. When relay 2L reoperates at the end of the first on-hook signal, relay 2P2 operates over the operated transfer contacts 2L–1, the released break contacts MST1–1 and 3RA1–1, the operated make contacts 2P1–2, the released transfer contacts 2P2–2, the winding of relay 2P2, and negative battery.

Relay 2P2 locks to ground through the operated transfer contacts 2P2–2, the operated make contacts 2P1–1, 3RA–2, and 60N–8, the released break contacts 7INT–1, and ground. On the next release of relay 2L, relay 2P1 releases in consequency of the interruption of its holding path at the make contacts 2P1–1. The first holding path to ground of relay 2P2 via the operated make contacts 2P1–1 is open, in response to the release of relay 2P1. However, relay 2P2 remains operated over the path including negative battery, the winding of relay 2P2, the operated transfer contacts 2P2–2, the operated make contacts 2SR–1, the released transfer contact 2L1–and ground. On the next operation of relay 2L, relay 2P2 releases. This cycle is then repeated with relay 2P1 and 2P2 remaining operated at the end of each odd-numbered pulse and remaining normal at the end of each even-numbered pulse. Relays 2P3, 2P4, and 2P5 are used in various combinations to count and remember the number of operations of relays 2P1 and 2P2. Specifically, at the end of the illustrative sequence of dial pulse-switching signals, pulse-counting relays 2P4, and 2P5 are in the operated state to represent the dialed digit 6.

The release of relay 3RA and the subsequent operation of relay 3RA1 at the beginning of the interdigital interval causes the pulse-counting relays 2P1 through 2P5 to be released, in response to the opening of the holding paths to ground. Make contacts 3RA–1 and 3RA–2 are released at the beginning of interdigital interval, and subsequently break contacts 3RA–1 and 3RA1–2 are operated thereby opening the holding paths for relay 2P1 through 2P5.

The auxiliary pulse-counting relay 2P2A performs two functions first, relay 2P2A removes dial tone from the transmission path, and second, relay 2P2A recognizes when the pulse-counting circuit counts a digit greater than one. Relay 2P2A is operated at the start of the second on-hook signal when relay 2P3 operates and a path from ground is extended to the winding of relay 2P2A, through the released transfer contacts 2P2A–6, the operated make contacts 2P3–1 and 2P2–6, released break contact 3RA1–2, operated make contacts 60N–8 and released break contact 7INT–1. Relay 2P2A is locked in the operated state by the extending of ground over the path comprising negative battery, the winding of relay 2P2A, the operated transfer contacts 2P2A–6, the operated make contacts 6ON–8, the released break contacts 7INT–1 and ground.

Figure 5:
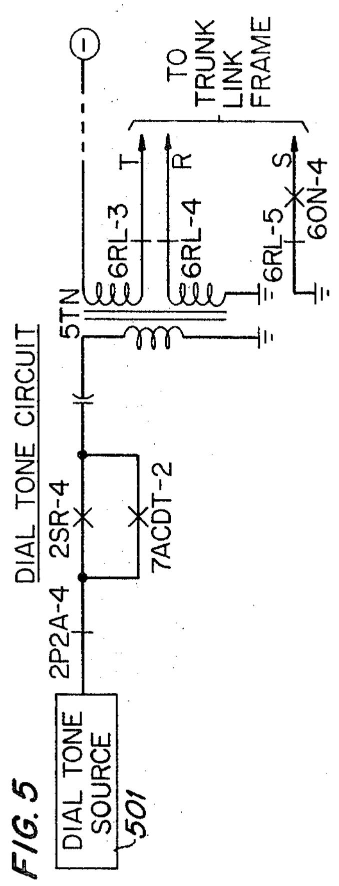

The dial tone signal that was previously impressed upon the transmission path, in response to the release of the marker 108 and the operation of relay 2SR, is removed by the operation of relay 2P2A. Referring to FIG. 5, the operation of break contact 2P2A–4 opens the path between the dial tone source and the dial tone transformer 5TN.

Digit Steering and Digit Registration

Figure 4:
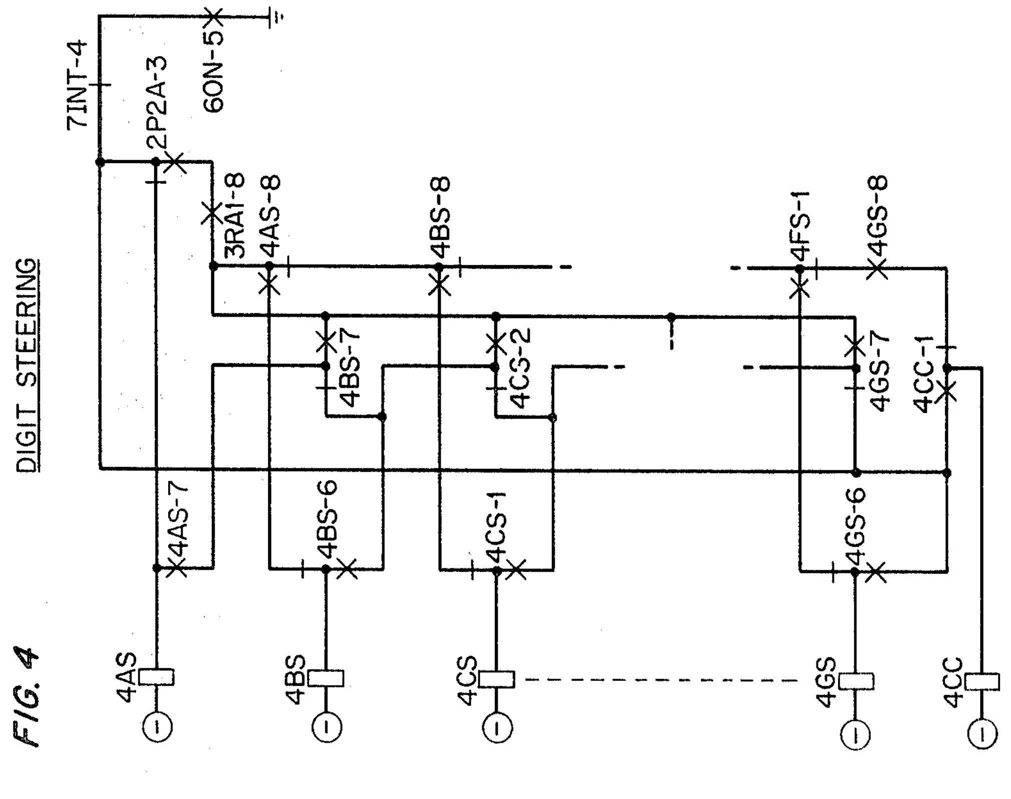

The digit-steering circuit which is shown in FIG. 4, successively connects the outputs of the pulse-counting circuitry to the digit register as the dialed digits are received. The steering circuit is also used to indicate whether or not a complete complement of dialed digits has been received. The digit-steering circuit consists of one relay per digit; i.e., seven relays 4AS through 4GS are included in this illustrative embodiment. A complete complement relay 4CC indicates when seven digits have been stored in the originating register 105.

The first digit-steering relay 4AS was previously operated when off-normal relay 6ON was operated in response to the initial seizure of the originating register 105 by the marker 108. Relay 4AS was operated from ground extended over the operated make contacts 60N–5, the released break contacts 7INT–4, and the released transfer contacts 2P2–3. The holding path for relay 4AS comprises negative battery, the winding of relay 4AS, the operated make contacts 4AS–7, and the released transfer contacts 4BS–7 through 4GS–7 of the released steering relays, the released break contacts 7INT–4, the operated make contacts 6ON–5, and ground.

The advance of the digit-steering relays is under the control of relay 3RA1. When relay 3RA1 operates at the end of the first digit with relay 2P2A operated, as explained above, relay 4BS operates over a path comprising negative battery, the winding of relay 4BS, the released transfer contacts 4BS–6, the operated transfer contacts 4AS–8, the operated make contacts 3RA1–8, the operated transfer contacts 2P2A–3, the released break contact 7INT–4, the operated make contacts 6ON–6, and ground. The holding path for relay 4BS comprises released transfer contacts 4CS–2 and the other contacts of the holding path previously described for relay 4AS.

The operation of relay 4BS, in response to the operation of relay 3RA1, alters the holding path for relay 4AS. The holding path for relay 4AS during the interdigital interval comprises negative battery, the winding of relay 4AS, the operated make contacts 4AS–7, transfer operated transfer contacts 4BS–7, the operated make contacts 3RA1–8, the operated transfer contacts 2P2A–3, the released break contacts 7INT–4, the operated make contacts 6ON–5, and ground. When relay 3RA1 release at the start of the next digit, relay 4AS releases due to the opening at make contact 3RA1–8.

This action repeats for each digit with the steering relay for the next digit operating when relay 3RA1 operates at the end of a digit and the steering relay for the digit just registered releasing when relay 3RA1 releases at the start of the next digit.

Relay 4CC is operated in response to the operation of relay 3RA1 and in conjunction with the following state of the digit-steering circuit: relay 4GS in the operated state and relays 4AS through 4FS in the released state; i.e., relay 4CC is operated subsequent to the storage of the seventh digit. Relay 4CC is operated over a path comprising negative battery, the winding of relay 4CC, the released transfer contacts 4CC–1, the operated make contacts 4GS–8, the released transfer contacts 4FS–1 through 4AS–8, the operated make contacts of 3RA1–8, the operated transfer contacts 2P2A–3, the released break contact 7INT–4, the operated make contacts 60N–5, and ground. The holding path for relay 4CC comprises negative battery, the winding of relay 4CC; the operated transfer contacts 4CC–1; the released break contacts 7INT–4; the operated make contacts 60N–5, and ground.

Referring to FIG. 3, the operation of the 4AS digit-steering relay, in response to the seizure of the originating register 105 by the marker 108, connected the digit registration relays 3AO through 3A7 to the translating network that comprises the contacts of the pulse-counting relays. The digit registration relays are operated on a "two out of five" basis by the extending of ground through the translating network to the windings of the digit registration relays.

Register advance relay 3RA controls the extending of ground through the translating network to the digit registration relays. Relay 3RA is operated in response to the extending of ground to the winding of relay 3RA through the operated make contacts 60N1–5 and the released break contacts 2L–3. The short circuiting of the secondary winding of relay 3RA with the make contact 3RA–6 causes relay 3RA to be a slow release and fast operate relay. Relay 3RA operates during the first on-hook dial pulse signal when relay 2L releases and will remain operated until the interdigital interval when relay 2L is held operated. Relay 3RA1 is operated by the extending of ground to the winding of relay 3RA1–1 through the operated make contact 60N–6 and the released break contact 3RA–3.

The digit registration relays are operated when relays 3RA and 3RA1 are in the released state; i.e., during the period subsequent to the release of relay 3RA, but prior to the operation of relay 3RA1. Specifically, at the start of the first interdigital interval pulse-counting relays 2P4 and 2P5 are operated and register advance relays 3RA and 3RA1 are released. The dial pulse digit 6 is represented in the "two out of five" code by the signal states 2 and 4. Relay 3A2 is operated by the extending of ground through the following contacts of the translating network: the operated make contacts 60N–6; the released transfer contacts MST1–2; the released break contacts 3RA–5; the released transfer contacts 2P2–8; the operated transfer contacts 2P4–8; the released transfer contacts 2P3–7; the released break contacts 3RA1–5; and operated transfer contacts 4AS–3 to the winding of relay 3A2. Relay 3A4 is operated by the extending of ground through the following contacts of the translating network: the operated make contacts 60N–6; the released transfer contacts MST1–2; the released break contacts 3RA–5; the released transfer contacts 2P2–8; the operated transfer contacts 2P4–8 and 2P5–7; the released transfer contacts 2P3–8; the released break contacts 3RA1–6; and the operated make contacts 4AS–4 to the winding of relay 3A4. Relays 3A2 and 3A4 are held operated by the extending of ground from the operated make contact 60N–4, the released break contacts 7INT–3, the operated make contacts 3A2–1 and 3A4–1 and the respective windings of the relays.

Abandonment Detection

It is assumed that subsequent to the dialing of the first digit 6 the customer abandons the call by placing the receiver of the station 101 on the switchhook. As described in the A. J. Busch patent, the following relays are in an operated state: 2L, 2SR, 2P2A, 3RA1, 3A2, 3A4, 4AS, 4BS, 60N, and 60N1. Pulse-counting relays 2P1 through 2P5 are in the released state following the release of relay 3RA and the operation of relay 3RA1.

The impressing of an on-hook signal on the transmission path causes the immediate release of relay 2L. The protracted release of relay 2L causes the release of slow release relay 2SR.

The digit-steering circuit (FIG. 4) is used to indicate the number of dialed digits received and stored in the originating register 105. In particular the operation of 4CC indicates the storage of a complete complement of digits for this illustrative embodiment.

As will be seen in the following explanation, relay 60N is under the control of the abandon call control circuit 106 and will remain in the operated state for a specified interval of time subsequent to the abandonment of the call during the signaling process. The indications that a customer has abandoned the call during the signaling process are the released state of relays 2SR and 4CC and the operated state of relay 60N.

Figure 7:
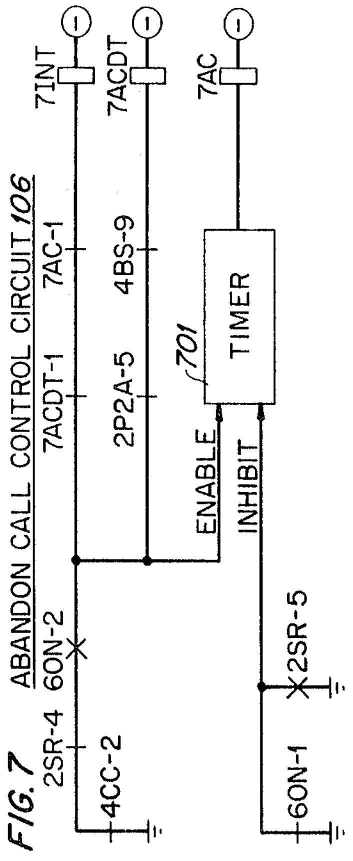
FIG. 7 is a schematic diagram of the abandon call control circuit shown as element 106 in FIG. 1.

Referring to FIG. 7, when the call is abandoned relay 7INT is operated by the extending of ground to the winding of relay 7INT via the released break contacts 4CC–2 and 2SR–4, the operated make contacts 60N–2, and the released break contacts 7AC–1 and 7ACDT–1. The operation of relay 7INT, in response to the detection of an abandonment of the call, will cause the clearing of the priorly stored signals from the pulse-counting, digit registration, and digit-steering circuitry. As described later herein, the subsequent release of relay 7INT will cause these designated elements of the originating register 105 to be restored to their initial state.

Figure 2:
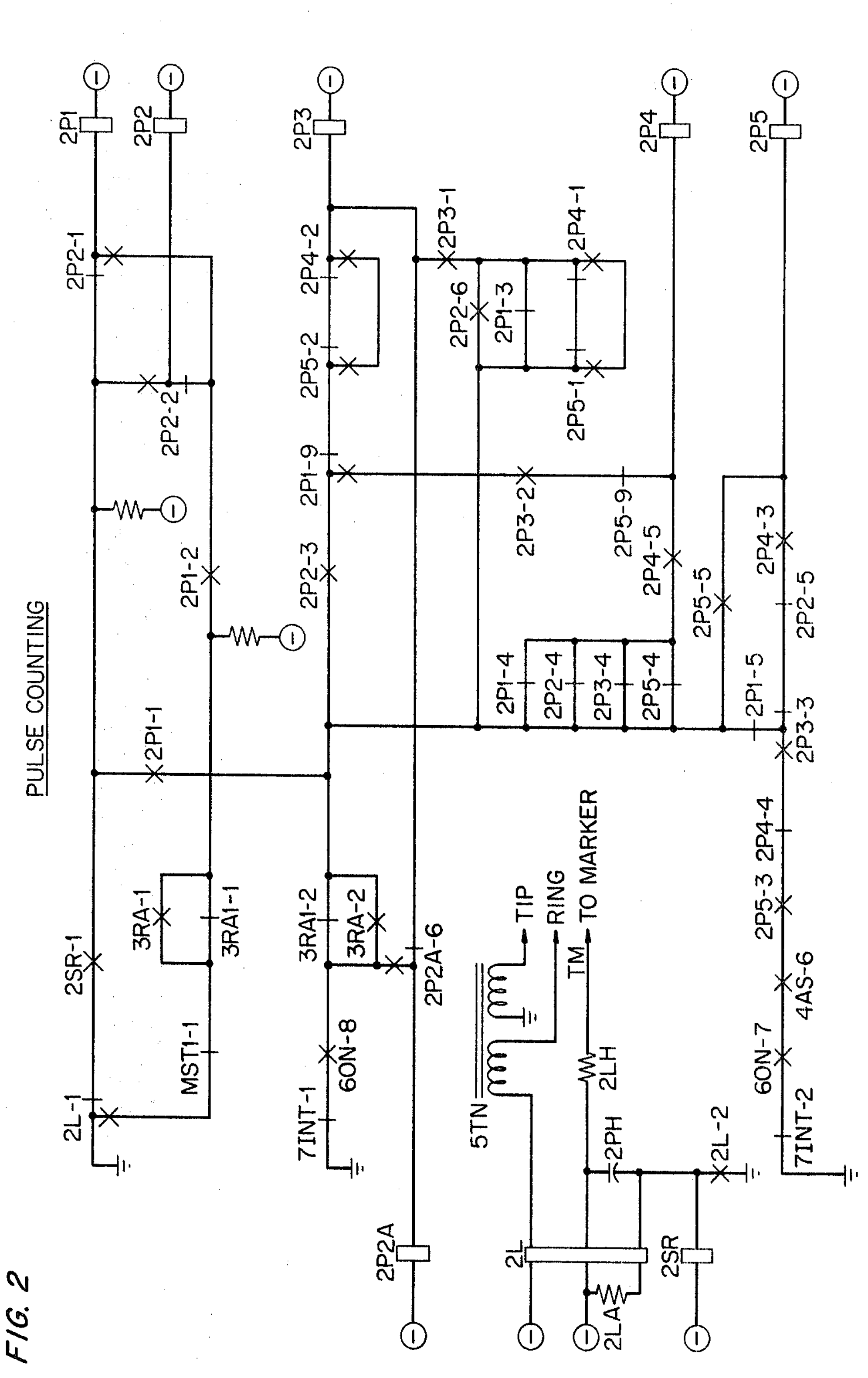
FIGS. 2 through 6 are diagrams in schematic form showing in greater detail portions of the originating register shown as element 105 in FIG. 1, in particular.

Relays 2L and 2SR are in the released state prior to the operation of relay 7INT. Referring to FIG. 2, the release of relays 2L and 2SR in conjunction with the operation of relay 7INT opens all holding paths to ground of the pulse-counting relays 2P1 through 2P5 and auxiliary pulse-counting relay 2P2A. The upper holding path for the relays 2P1 and 2P2 is opened by the release of contacts 2L–1 and 2SR–1. The center holding path for relays 2P1 through 2P5 and 2P2A is opened by the operation of break contacts 7INT–1, while the lower holding path for the pulse-counting relays is opened by the operation of break contact 7INT–2. As described later herein, the release of relay 7INT will restore the relays 2P1 through 2P5 and 2P2A to the initial state; i.e., all pulse-counting relays will be in the released state.

Referring to FIGS. 3 and 4, the digit registration and digit-steering circuits of the originating register 105 are initialized by the operation of relay 7INT. The operation of break contacts 7INT–3 opens the holding path to ground for the digit registration relays 3A0 through 3G7; while the operation of break contacts 7INT–4 opens the holding path to ground of the digit-steering relays 4AS through 4GS. Thus, the operation of break contacts 7INT–3 and 7INT–4 clears the priorly stored signals from the digit registration and digit-steering relays.

The successful clearing of the originating register 105 of priorly stored signals is indicated by the release of relays 2P2A and 4BS of the pulse-counting and digit-steering circuitry. The abandon call dial tone relay 7ACDT is now operated over a path to ground that includes negative battery, the winding of relay 7ACDT, the released contacts 2P2A–5 and 4BS–9, the operated make contacts 60N–2 and the released break contacts 2SR–4, and 4CC–2.

Relay 7INT is released in response to the operation of break contacts 7ACDT–1 in the holding path to ground of relay 7INT. Referring to FIGS. 2 and 3, the release of relay 7INT, in response to the operation of relay 7ACDT, positions the pulse-counting relays 3A0 through 3G7 in their released state. Thus, the pulse-counting and digit registration circuits are placed in the same state they were in initially when the marker 108 was released from the originating register 105. Referring to FIG. 4, in response to the release of relay 7INT relay 4AS is operated over the path from ground comprising the operated make contacts 60N–5, the released break contact 7INT–4, the released transfer contacts 2P2A–3, the winding of relay 4AS and negative battery. The released state of relays 2P2A and 3RA1 prevents ground from being extended to relays 4BS through 4GS and 4CC. Thus, the release of relay 7INT, in response to the operation of relay 7ACDT, restores the digit-steering relays to their initial state which existed when the marker 108 was released from the originating register 105; i.e., relay 4AS is in the operated state, and relays 4BS through 4CC are in the released state. In summary, the release of relay 7INT, in response to the operation of relay 7ACDT, positions the designated elements of the originating register 105 in their initial state, such that signals subsequently received from the station 101 will be processed as a new call in the fashion described in the A. J. Busch patent.

Abandon Call Dial Tone Connection

The operation of the dial tone circuit has been fully described in the A. J. Busch patent with respect to the tasks performed in the processing of a normal call origination. The dial tone circuit, shown in FIG. 5, will be described herein only with respect to the circuit actions that are performed subsequent to the detection of an abandonment of a call during the signaling process. Dial tone is extended to the station 101 from the dial tone source 501 over the transmission path comprising: the released break contacts 2P2A–4, the operated make contacts 7ACDT–2, the transformer 5TN, the released break contacts 6RL–3 and 6RL–4 of the release relay 6RL, the switching network and the line to the station 101.

Timing

Referring to FIG. 7, timer 701 measures the elapsing of the specified time interval permitted for the originating of another call subsequent to the abandonment of a call during the signaling process. Timer 701 is started and stopped respectively the the impressing of a ground going signal on the enable and inhibit terminals of the timer 701. Relay 7AC is operated in response to the extending of ground from timer 701 upon the elapsing of the specified interval of timer 701. The measurement of the specified interval of timer 701 begins in response to the detection of the abandonment of a call during the signaling process; i.e., the operated state of relay 60N and the released state of relays 2SR and 4CC.

Coincident with the establishment of the holding path to ground for relay 7INT, timer 701 has a ground-going signal impressed on the enable terminal of the timer 701 from the path comprising the operated make contacts 60N–2 and the released break contacts 2SR–4 and 4CC–2. Timer 701 is stopped by either the operation of the make contacts 2SR–5 or the release of break contacts 60N–1, either of which impresses a ground-going signal on the inhibit terminal of timer 701. The impressing of a ground-going signal on the inhibit terminal of timer 701, prior to the elapsing of the time interval specified by timer 701 prevents the extending of ground to relay 7AC. The impressing of a ground-going signal upon the inhibit terminal subsequent to the elapsing of the time interval specified by timer 701 causes the removal of the ground that was extended to relay 7AC.

Failure to Originate Another Call Within the Specified Time Interval (FIGS. 6 and 7)

Assume that the customer at station 101 does not originate another call within the specified time interval subsequent to the abandonment of the call during the signaling process. Referring to FIG. 7, the elapsing of the time interval specified by timer 701 causes ground to be extended to the winding of relay 7AC. The operation of relay 7AC, in response to the elapsing of the specified interval, causes the release circuit (FIG. 6) of the originating register 105 to be activated. The operation of the release and off-normal circuits has been fully described in the A. J. Busch patent with respect to the tasks performed in the processing of a normal call. The release and off-normal circuits (FIG. 6) will be described herein only with respect to the circuit actions that are performed subsequent to the detection of an abandonment of a calling connection during the signaling process.

Referring to FIG. 6, relay 6RL is operated by the extending of ground to the winding of relay 6RL via the operated make contacts 7AC–2 and the priorly operated make contacts 60N–1. The operation of relay 6RL causes the following circuit actions in the originating register 105: first, the opening of the tip and ring transmission path between the originating register 105 and the station 101; second, the tearing down of the switching network segment of the transmission path; and third, the release of off-normal relays 60N1 and 60N. The tip and ring transmission path between the originating register 105 and the station 101 is opened in response to the operation of break contacts 6RL–3 and 6RL–4 pending the tearing down of the transmission path through the switching network.

The sleeve lead ground is removed by the operation of break contacts 6RL–5. The removal of ground from the sleeve lead of the retained transmission path causes the tearing down of the switching network segment of the transmission path.

The off-normal relays 60N1 and 60N are controlled by relay 6RL. The operation of break contacts 6RL-2 causes the release of relay 60N1 by the opening of the holding path to ground of relay 60N1. The release of relay 60N1 causes the release of relay 60N. The release of make contacts 60N1-3 opens the holding path to ground for relay 60N. As disclosed in the A. J. Busch patent, the release of the off-normal relays 60N1 and 60N causes the release of all relays in the originating register 105 including relay 4AS.

The operation of relay 7AC initiates the deactivation of the abandon call control circuit 106. The release of relay 60N, in response to the operation of relays 7AC and 6RL, inhibits the timer 701 by impressing a ground-going signal on the inhibit terminal of timer 701 via the released break contacts 60N-1. The inhibiting of timer 701 removes ground from relay 7AC and causes the release of relay 7AC. The release of relay 60N also opens the holding paths to ground of relays 7INT and 7ACDT, at make contact 60N-2, thereby causing the release of both relays.

In summary, the release of the off-normal relays 60N1 and 60N in the originating register 105, in response to the operation of relay 7AC of the abandon call control circuit 106, causes the release of all relays in both the originating register 105 and the abandon call control circuit 106. Thus, the operation of relay 7AC, in response to the elapsing of the specified interval of timer 701, ultimately causes the release of all relays in the originating register 105 and the abandon call control circuit 106. Therefore, the elapsing of the time interval specified by the timer 701 without an origination of another call results in the positioning of the combination of the originating register 105 and the abandon call control circuit 106 in the quiescent state where the originating register 105 is ready for another seizure by the marker 108.

Another Call is Originated Within the Specified Interval (FIGS. 2, 5, 6, and 7)

Assume now that the customer at station 101 does originate another call within the specified time interval. Referring to FIG. 2, relay 2L is operated in response to the off-hook signal associated with the origination of the call. As priorly described, relay 2SR is operated in response to the operation of relay 2L.

Referring to FIG. 7, the operation of relay 2SR, in response to the off-hook signal from station 101, causes the timer 701 to be stopped by the impressing of a ground-going signal on the inhibit terminal of timer 701 via the operated make contact 2SR-5. The stopping of timer 701, in response to the operation of relay 2SR, prevents the extending of ground to the winding of relay 7AC. Thus the origination of another call within the specified interval inhibits the operation of relay 7AC.

As previously detailed in the description of the release circuit (FIG. 6), relay 6RL is inhibited from operating by the released state of relay 7AC. The inhibiting of relay 6RL prevents the release of the priorly established transmission path. The previously described clearing of priorly stored signals from the designated elements of the originating register 105, in response to the operation of relay 7INT, preconditioned the originating register 105 for the processing of switching signals subsequently transmitted by the reoriginating customer; i.e., relay 4AS was operated and relays 4BS through 4GS and 4CC, 3A0 through 3G7, 2P1 through 2P5 and 2P2A were released. Thus, the signals that are transmitted from station 101, subsequent to the origination of another call within the specified time interval, will be processed as a new call in the fashion described in the A. J. Busch patent.

While the circuitry of this invention has been described with reference to a particular embodiment wherein an abandon call control circuit 106 is arranged to automatically retain the transmission path between the calling customer's station 101 and the originating register 105 for a specified interval, it is to be understood that such an embodiment is intended to be illustrative of the principles of the invention and that numerous other arrangements may be devised by those skilled in the art without departing from the spirit and scope of the invention. For example, the invention may be used in a telephone central office that utilizes a stored program controlled communication switching system such as the No. 1 ESS disclosed in the *Bell System Technical Journal*, Volume 43, Sept. 1964. In particular, appropriate modifications of the digit analysis program will provide for the retention of the transmission path for a specified time period subsequent to the detention of a protracted interdigital interval, subject to the condition that an incomplete complement of digits has been received and stored. The digit analysis program is described in an article entitled "No. 1 ESS Calling Processing," by D. H. Carbaugh, G. G. Drew, H. Ghiron, and Mrs. E. H. Hoover in Volume 43 of the *Bell System Technical Journal* at pages 2483—2531.

What I claim is:

1. In a communication system,
receiving means for receiving a sequence of information signals over an established transmission path,
detecting means for detecting a special signal received over said path,
conditioning means responsive to said detecting means for conditioning said receiving means to receive a new sequence of information signals over said path, and
releasing means controlled by said detecting means for releasing said path after the elapsing of a specified interval of time without the reception of a new information signal.

2. In a communication system, the combination set forth in claim 1 further comprising:
means responsive to said receiving means for inhibiting said releasing means when said new information signal is received within said specified interval of time.

3. The combination set forth in claim 1 further comprising:
control means controlled by said receiving means for controlling selectively said conditioning means in accordance with the content of a received information signal sequence.

4. In a communication system, the combination set forth in claim 1 further comprising:
transmitting means responsive to said conditioning means for transmitting an alerting to said conditioning means for transmitting an alerting signal over said transmission path.

5. A communication system comprising:
receiving means for receiving a sequence of call information signals over an established transmission path,
detecting means controlled by said receiving means for detecting a disconnect signal prior to the reception of a complete sequence of said information signals,
timing means responsive to said detecting means for measuring a specified interval of time, and
control means jointly responsive to said detecting means and said timing means for alternatively controlling the release or retention of said transmission path.

6. The combination set forth in claim 5 further comprising:
initializing means responsive to said detecting means for preparing said receiving means to receive a new sequence of signals over said path.

7. The combination set forth in claim 6 wherein said control means comprises:
inhibiting means responsive to said receiving means upon reception of a new call information signal within said specified interval of time for inhibiting said timing means from further measurement of said interval of time and for inhibiting release by said control means of said transmission path.

8. A communication system comprising:
receiving means for receiving a sequence of call information signals over an established transmission path,
monitoring means for detecting a disconnect signal,
initializing means jointly responsive to reception by said receiving means of less than a complete sequence of information signals and to detection of said disconnect signal by said monitoring means for preparing said receiving means to receive a new sequence of information signals over said path, timing means jointly responsive to said reception of less than a complete sequence of information signals by said receiving means and to said detection of said disconnect signal by said monitoring means for measuring a specified interval of time, and release control means enabled by said timing means upon expiration of said specified interval of time for disconnecting said transmission path.

9. The combination set forth in claim 8 further comprising:

inhibiting means controlled by said receiving means for inhibiting said timing means upon reception of a new information signal over said path within said specified interval of time.

10. The combination set forth in claim 8 wherein said disconnect signal comprises a protracted on-hook signal.

11. In a communication system, a station comprising means for generating station designation signals and a station disconnect signal;

a register for receiving and registering station designation signals;

switching means controlled by said station for selectively establishing a signal transmission path between said station and said register;

said register responsive to registration therein of a complete complement of station designation signals for initiating a calling connection from said station to another station indicated by said complete complement of station designation signals;

detecting means for detecting a station disconnect signal;

initializing means jointly responsive to the registration in said register of less than a complete complement of said station designation signals and to detection of said disconnect signal by said detecting means for returning said register to the initialized state wherein said register is prepared to receive and register new station designation signals over said established signal transmission path;

timing means jointly responsive to the registration in said register of less than a complete complement of station designation signals and to detection of said disconnect signal by said detecting means for measuring a specified interval of time;

inhibiting means controlled by said register and said timing means for inhibiting said timing means upon the reception of a new station designation signal by said register within said specified interval of time; and release control means enabled by said timing means upon expiration of said specified interval of time for releasing said signal transmission path between said station and said register.

12. In a communication system, the combination set forth in claim 11 further comprising:

restoring means actuated by said release control means for restoring said register, said detecting means, and said timing means to the quiescent state wherein said register is prepared to receive another complement of station designation signals over a subsequently established signal transmission path.

13. In a communication system, the combination set forth in claim 11 further comprising:

alerting means responsive to said initializing means for transmitting an alerting signal over said signal transmission path to said station to indicate said initialized state of said register.

14. In a communication switching system, the method of controlling call-signaling connections and recording equipment comprising the steps of:

establishing a signaling path between a subscriber station and a call register responsive to a service request signal from said station;

recording in said register call signals from said station;

clearing said register in response to an abandon signal from said station;

releasing said path responsive to said abandon signal a predetermined interval of time after the occurrence of said abandon signal in the absence of a service request signal during said time interval; and inhibiting in response to a service request signal during said time interval the release of said path at the lapse of said time interval.

15. In a communication switching system, the method of controlling call-signaling connections and recording equipment comprising the steps of:

establishing a signaling path between a subscriber station and a call register responsive to an off-hook signal from said station;

recording in said register call signals from said station;

clearing said register in response to an abandon signal from said station;

enabling timing means in response to said abandon signal;

inhibiting said timing means in response to an off-hook signal prior to the lapsing of a predetermined time interval; and absent inhibiting of said timing means, releasing said path when said timing means indicates the expiration of said predetermined time interval.

16. In a communication switching system, the method of controlling call-signaling connections and recording equipment comprising the steps of:

establishing a signaling path between a subscriber station and a call register responsive to an off-hook signal from said station;

recording in said register call signals from said station;

clearing said register to record new call signals over said path in response to an abandon signal from said station;

delaying the release of said path for a fixed time interval in response to said abandon signal;

disabling the delaying function and inhibiting the release of said path in response to another off-hook signal prior to the lapsing of said fixed time interval; and releasing said path at the end of said fixed interval of time in the absence of said other off-hook signal.

17. In a communication switching system, the method of controlling call-signaling connections and recording equipment as set forth in claim 16, further comprising the step of:

alerting said station to indicate the condition wherein said register is ready to record said new call signals in response to said clearing function.

18. In a communication switching system the method of controlling call-signaling connections and recording equipment as set forth in claim 16, further comprising the step of:

restoring said register to the quiescent state in response to the releasing of said path, wherein said register is prepared to be assigned to record another group of call signals over a subsequently established signaling path.

UNITED STATES PATENT OFFICE
CERTIFICATE OF CORRECTION

Patent No. 3,586,785 Dated June 22, 1971

Inventor(s) Alexander Feiner

It is certified that error appears in the above-identified patent and that said Letters Patent are hereby corrected as shown below:

Column 1, line 57, after "call" and before "control" it should read --abandonment during the signaling process. The abandon call--.

Signed and sealed this 18th day of April 1972.

(SEAL)
Attest:

EDWARD M.FLETCHER,JR.
Attesting Officer

ROBERT GOTTSCHALK
Commissioner of Patents

FORM PO-1050 (10-69)

USCOMM-DC 60376-P69
☆ U.S. GOVERNMENT PRINTING OFFICE : 1969 O—366-334